(12) United States Patent
Zahner

(10) Patent No.: US 6,494,248 B1
(45) Date of Patent: Dec. 17, 2002

(54) SUSPENDED MATERIALS HAVING EXTERNAL SLITS

(75) Inventor: David Zahner, New York, NY (US)

(73) Assignee: Zahner Design Group, Ltd., New York, NY (US)

(*) Notice: Subject to any disclaimer, the term of this patent is extended or adjusted under 35 U.S.C. 154(b) by 0 days.

(21) Appl. No.: 09/617,402

(22) Filed: Jul. 17, 2000

Related U.S. Application Data

(60) Provisional application No. 60/143,853, filed on Jul. 15, 1999, provisional application No. 60/150,876, filed on Aug. 26, 1999, provisional application No. 60/171,081, filed on Dec. 15, 1999, and provisional application No. 60/203,873, filed on May 12, 2000.

(51) Int. Cl.[7] .............................................. A47H 1/00
(52) U.S. Cl. ...................................... 160/330; 160/390
(58) Field of Search ................................. 160/330, 348, 160/383, 384, 385, 390, 327, 368.1; 16/87 R, 87.2; 24/716

(56) References Cited

U.S. PATENT DOCUMENTS

| | | | |
|---|---|---|---|
| 635,295 A | * 10/1899 | Brown | 16/87.2 |
| 759,045 A | * 5/1904 | Tracy | 16/87.2 |
| 996,886 A | * 7/1911 | Schneider | 16/87.2 |
| 1,564,301 A | * 12/1925 | Wilson | 16/87.2 |
| 2,011,815 A | 8/1935 | Johnson | |
| 2,551,384 A | * 5/1951 | Middleton et al. | 16/87.2 |
| 2,666,481 A | * 1/1954 | White | 160/348 X |
| 2,711,555 A | * 6/1955 | Hanson | 16/87.2 |
| 2,828,900 A | * 4/1958 | Le Roy | 16/87.2 |
| 2,831,538 A | 4/1958 | Lishman | |
| 2,897,535 A | * 8/1959 | Radler | 16/87.2 |
| 3,115,181 A | 12/1963 | Snyder | |
| 3,772,734 A | 11/1973 | Kimel | |
| 4,031,943 A | * 6/1977 | Silvestre | 160/330 |
| 5,101,877 A | 4/1992 | Subecz et al. | |
| 5,111,868 A | * 5/1992 | Sawaya | 160/330 |
| 5,186,232 A | * 2/1993 | Zahner | 160/330 |
| 5,367,742 A | 11/1994 | Bindman | |
| 5,421,059 A | 6/1995 | Leffers, Jr. | |
| 5,806,141 A | 9/1998 | Kolisch | |
| 6,189,597 B1 | * 2/2001 | Cheng | 160/330 X |

* cited by examiner

Primary Examiner—David M. Purol
(74) Attorney, Agent, or Firm—Morris E. Cohen

(57) ABSTRACT

A hanging material such as a curtain is provided with openings each having a slit therein for attachment to a fixed rod. Each opening is reinforced with rings having projecting flanges extending beyond the ring away from the curtain. The projecting flanges of the rings makes it easier to open up the ring thereby facilitating the placement of the curtain upon the fixed rod.

29 Claims, 7 Drawing Sheets

SUSPENDED MATERIALS HAVING EXTERNAL SLITS

RELATED APPLICATIONS

The present application claims all rights of priority to U.S. Provisional Application Serial No. 60/143,853 filed Jul. 15, 1999, U.S. Provisional Application Serial No. 60/150,876, filed Aug. 26, 1999, U.S. Provisional Application Serial No. 60/171,081 filed Dec. 15, 1999, U.S. Provisional Application Serial No. 60/203,873 filed May 12, 2000, and the U.S. Provisional Application entitled "Suspended Bath Products and Clothing and Accessory Receptacles" filed by the present inventor on Jul. 12, 2000 (serial number to be assigned). The contents of all of those prior applications are hereby fully incorporated herein by reference.

FIELD OF THE INVENTION

The present invention relates to an accessory for attaching and detaching materials from a rod without requiring removal of the rod or adding additional hardware, such as hooks or the like, to the fabric.

BACKGROUND OF THE INVENTION

U.S. Pat. No. 5,186,232, issued on Feb. 16, 1993 (which is fully incorporated herein by reference), discloses and claims an accessory product for easily mounting and detaching a material from a rod without removing the rod. The accessory product is intended for use with hanging or otherwise suspended materials, such as window treatments (window curtains, drapes, etc.), shower curtains, windscreens, towels, and so forth. Such suspended materials (referred to herein as "hanging materials" for brevity) are well known in the art, and are often mounted onto rods.

In one system of the prior art, separate devices, such as hooks or clips, are utilized to connect portions of the curtain to the rod. In an alternative system of the prior art, the curtain or drape is mounted by threading a rod through the reinforced holes in that curtain.

As an advance over the prior art products, the '232 patent discloses an accessory invention, as shown in FIG. 5, which allows a curtain or so forth to be attached to a mounting rod without the need for hanging support hooks, clips, and so forth, while also avoiding the need to remove the rod from its supports. The accessory is useful in a large variety of applications, including shower curtains and other household and commercial products. It involves a series of reinforced openings with slits provided between alternating paired sets of holes, thereby allowing the hanging material to be attached over the rod without the need for threading or hooks. Further advances and improvements to the inventions disclosed in the '232 patent are provided herein.

BACKGROUND OF THE INVENTION

In accordance with the invention, a hanging material such as a curtain (e.g. a window curtain or a shower curtain) or other product is provided with a slit therein for attachment of the hanging material to a fixed rod without removing the rod. In a preferred embodiment, the material has a fastener therein, as well, the slit extending through the fastener. In a further preferred embodiment, the hanging material includes at least one external slit, i.e. a slit, at any angle, which intersects an edge of the hanging material. In a further preferred embodiment, the external slit is one (at any angle) which extends through the inside circumference or inner edge of a fastener at one end and the outer edge of the hanging material at the other end.

The invention can be used for window treatments, shower curtains, drapery, portieres, room dividers, blinds, accessory tapes, and windscreens, or other hanging items. The fastener, which can be made of a rigid, or semi-rigid material (i.e. a material with some flexibility), is preferably integrated into the hanging material and facilitates the attachment of the material to the rod without the need to remove the rod from its supports. The slit is of any shape or size desired. Further objects and features of the invention will be apparent in conjunction with the drawings and detailed disclosure provided herein.

DETAILED DESCRIPTION OF THE INVENTIONS AND THE PREFERRED EMBODIMENTS

In accordance with the present invention, an apparatus is provided which allows a curtain or so forth to be attached to a mounting rod without the need for using additional support hooks, clips, or like, and while also avoiding the need to remove the rod from its supports.

Figure 1:
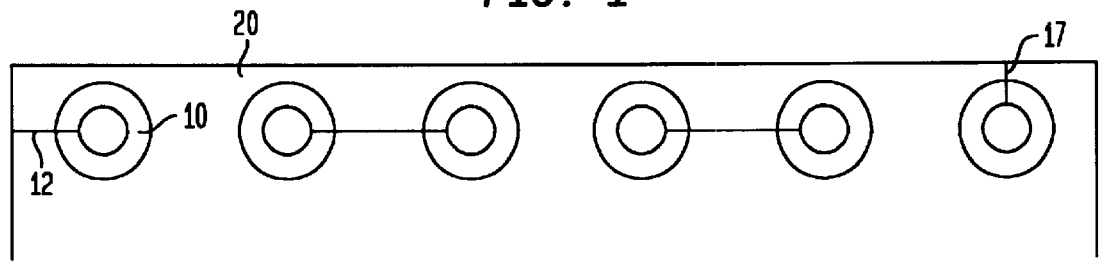
FIG. 1 is a front view of an hanging product having at least one external slit therein, in accordance with one embodiment of the present invention.
Figure 33:
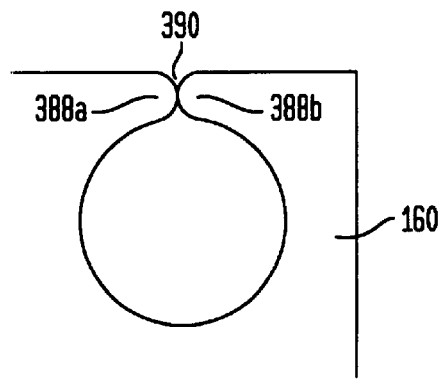

In the present invention, as shown in FIG. 1, openings are provided each having a slit provided therein. In accordance with the invention, the slit can be of any shape or size desired, whether straight, curved, or so forth. Likewise it can be of any width desired, whether a uniform width, or a width which changes over the length of the slit, e.g. in an hourglass shape, as with slit 390 of FIG. 33.

In the embodiment shown in FIG. 1, each opening is reinforced with a fastener such as a ring 10. Ring 10 can be made of homo polypropylene, ABS, or other suitable materials. These materials are strong enough to support the various fabrics commonly used for curtains, drapes, and so forth. In addition, they also have excellent memory so that, after being flexed to fit over the rod, the ring automatically springs back to its original position.

As disclosed in the '232 patent, pairs of rings can be provided having a horizontal slit connecting each pair. In a further embodiment of the invention, the hanging product includes at least one external slit therein. By external slit, the present application refers to a slit which passes through the material of the hanging product (and through a ring as well if one is provided) to ultimately exit outside the suspended material 20. Examples of external slits are horizontal external slit 12 and vertical external slit 17. Various other examples of external slits are provided herein.

The external slit can be in any orientation and, when used in conjunction with a ring, can extend through any position on the ring, whether the "12 o'clock" position, or to 1 o'clock, 2 o'clock, 10 o'clock, 11 o'clock, or so forth. Rings with external slits can be provided to the hanging product in addition to the horizontally slit rings of the '232 patent, as shown, for example, in FIG. 1. Alternatively, the hanging product can be provided with externally slit rings only.

In the embodiment shown in the FIG. 1, the ring 10 is located within the suspended material 20 and external slit 17 extends from the ring and through the suspended material 20, exiting at the suspended material 20's edge. In other words, a space of suspended material 20 exists between the ring 10 and the outside of the suspended material 20, and the external slit extends through that space. Ring 10, as with the other rings or fasteners of the present invention can be attached to the hanging product via any desired secure means. For example, the rings can be attached by staking, by sealing, by sewing, by welding, or by using any of the methods of U.S. Provisional Application Serial No. 60/150,876, filed Aug. 26, 1999, whose contents are fully incorporated herein by reference.

In one embodiment of the invention, as shown in FIG. 1, a closed ring 10 is provided. The term closed ring refers to the fact that the external slit is normally "closed"—i.e. the two radial edges which form the slit 17 are pressed together. In this embodiment, the ring has some degree of flexibility, and must be flexed for the slit to open, i.e. for the edges of the slit to move some distance apart. Flexing the ring increases the width of the gap to insert the ring over the rod. The slit extends through the ring until the edge of the hanging product (whether that edge of the hanging product is beyond the edge of the ring or coincides with it as shown in various embodiments below).

Figure 2:
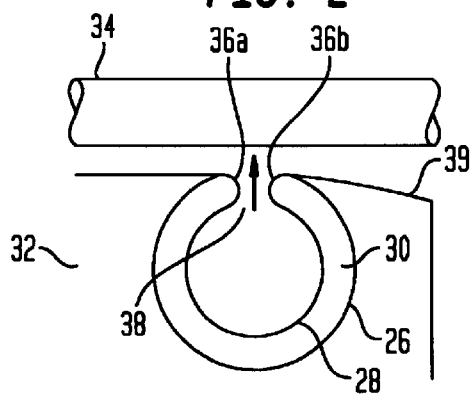
FIG. 2 is a front view of a hanging product in accordance with a further embodiment of the present invention utilizing an open ring structure.

In an alternate or additional embodiment of the invention, as shown in FIG. 2, an open ring 30 is provided in the material 32 for attachment of the hanging product to the rod or bar 34. In accordance with this embodiment, ring 30 is an open ring which is provided with rounded edges 36. A space is provided between the edges of the open ring, forming a mouth or gap 38 which acts as the external slit. Preferably, the gap is approximately 1/16" to 1/8" in diameter, although larger or smaller gaps can be used, depending on the application, rod size, and shape. Further preferably, the upper edge of ring 30 is tangent to the upper edge 39 of suspended material 32.

In this embodiment, rounded edges 36 and mouth 38 form an external slit design which is easier for a person to attach to rod 34. The embodiment of FIG. 2 is to be contrasted wih the embodiment shown in FIG. 1. As shown in FIG. 1, a closed ring is provided having a radial slit therethrough. The ring is closed in that the slit 17 consists of a right radial edge and a left radial edge of the ring, those right and left radial edges being pressed against each other. In contrast, the embodiment of FIG. 2 provides an open ring structure in which a gap exists between the left radial edge 36a of the ring and the right radial edge 36b of the ring, radial edges 36a and 36b being the edges extending from the outer circumference or outer edge 26 to the inner circumference or inner edge 28 of the fastener or ring.

Furthermore, it is preferred that the radial edges of the open ring be rounded as shown in FIG. 2. Open mouth 38 and rounded edges 36 facilitate the attachment of the ring to the rod from below, and further facilitate the attachment of the ring with one hand. These features are of general advantage to all users, and are of particular advantage to those who may be shorter such as children and the handicapped, or who have trouble opening the ring due to problems such as arthritis.

Figure 3:
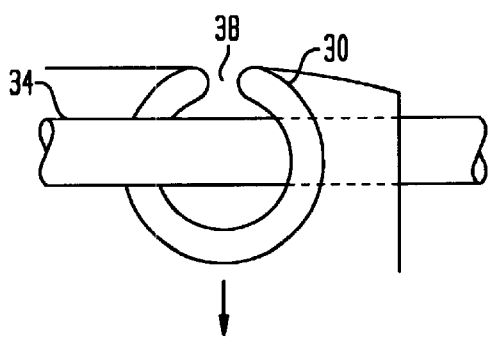
FIG. 3 is a front view of the product of FIG. 2, showing the product placed onto a rod.

FIG. 3 illustrates the embodiment of FIG. 2 as attached to rod 34. In addition to providing ease of attachment, the embodiment of FIG. 2 also provides ease of detachment. Furthermore, as a safety function, if the suspended material is pulled strongly enough from the bottom, the ring and suspended material will easily detach from the rod before pulling the rod out of the wall due to the presence of the wide mouth.

Figure 4A:
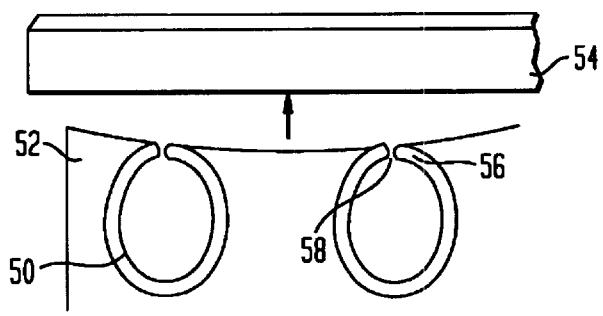
FIGS. 4(a) and 4(b) are front view of further embodiments of the invention, in which the rings of the invention are elongated.

In an alternate embodiment of the invention, ring 50 is elongated in shape, as shown in FIG. 4a. In the preferred embodiment, the elongated shape is an oval. The elongated shape of the ring facilitates attachment of the ring to a square or rectangular rod. As a result, the embodiment can be utilized with drapes, window treatments, blinds, and so forth. Ring 50 can include an open mouth 58, as in the embodiment of FIG. 2, or, alternatively, it can have a closed mouth, such as shown in FIG. 1 and, for example, FIGS. 22–27. The ring can also have the upper edge of ring 50 tangent to upper edge 59 of the suspended material. As an alternative to the use of an oval, which is preferred, the elongated ring can be any non-circular shape, including, for example, a rectangle or quadrilateral. One such shape is provided in FIG. 4(*b*). Moreover, the external and/or internal edges of the ring need not be rounded although they are preferably so.

Figure 4B:
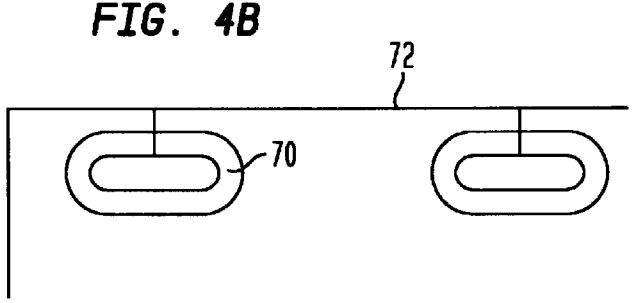
Figure 4C:
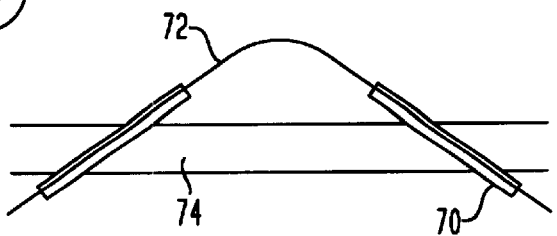
FIG. 4(c) is a top view of the embodiment of FIG. 4(b).

The ring 50 can be elongated vertically, as shown in FIG. 4(*a*), or can be elongated horizontally, as shown in FIG. 4(*b*). Use of the horizontally elongated ring 70 of FIG. 4(*b*) allows the curtain 72 to spread more in a lateral direction (i.e. from left to right) along the curtain rod. The same curtain will spread out or widen more along a rod 74 using the horizontally elongated ring of FIG. 4(*b*) than it would using a rounded ring such as the ring 30 of FIG. 2. Thus, using the embodiment of FIGS. 4(*b*) and 4(*c*), less curtain material is needed to cover the width of a given window, or to extend along the width of a given shower, or so forth. The width of curtain material necessary is less than with the hooks of the prior art and is also less than with the external slit embodiment shown in FIG. 2. This embodiment is also useful in conjunction with pleated curtains (including shower curtains), blinds, portierres, room dividers, window treatments, drapery, curtains sharper folds, and the like, as in FIG. 4(*c*).

Figure 5:
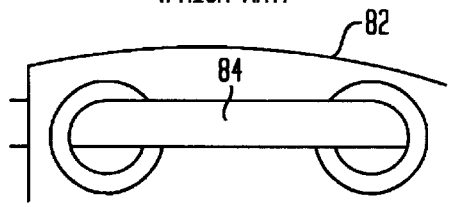
FIG. 5 is a front view of a horizontally-slit accessory product, in accordance with the the invention of U.S. Pat. No. 5,186,232.
Figure 6:
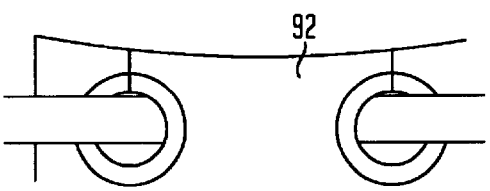
FIG. 6 is a front view of a hanging product with externally slit rings, in accordance with the present invention.

An illustration of a comparison of the unmodified invention of the '232 patent to the external slit inventions of the present application is shown in FIGS. 5 through 8. FIG. 5 is a front view of the invention of the '232 patent, with FIG. 7 being a top view thereof. FIG. 6 is a front view of the external slit inventions herein, with FIG. 7 being a top view thereof.

Figure 7:
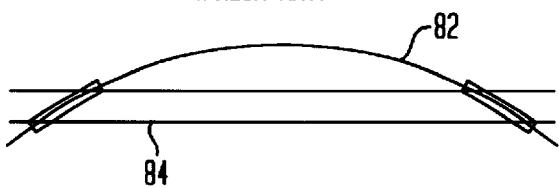
FIG. 7 is a top view of the embodiment of FIG. 5.

As shown in the figures, in some instances the external slit devices may be used to provide certain patterns of flow of a curtain (e.g. the way it folds, hangs, etc). Depending on the desired results, they may be used in conjunction with the rings of the '232 device or by themselves. As shown in FIG. 5 and in the top view of FIG. 7, using the devices of the '232 patent, the left (and right) edge of the curtain 82 will normally point outward (away from a shower or window) when placed on a rod 84. If the end of the '232 curtain were placed on rod 84 to point inward (toward a shower or window, as shown, for example, in FIG. 8 with respect to the external slit embodiment) the horizontal slit between the rings would be forced out toward the viewer. This is unusable, however, since it would make the horizontal slit visible which is aesthetically undesirable. In the normal design of the '232 patent, the horizontal slit is only placed between every second pair of rings rather than between every pair, causing the horizontal slits to all face toward the wall and not toward the viewer. Yet, a consequence of this is that the leftmost and rightmost ends of the curtain are both concave toward the wall, as shown in FIG. 7.

Figure 8:
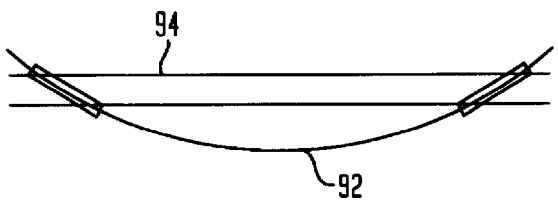
FIG. 8 is a top view of the embodiment of FIG. 6.

In many applications (such as with window curtains, for example) it is normally preferable to have the curtain concave toward the viewer, i.e. the edge pointed away from the viewer as shown in FIG. 8. This effect is produced by the external slit embodiments, as shown in FIGS. 6 and 8. When the curtain is concave in this fashion, a more aesthetic appearance is produced for the curtain. Indeed, this is the industry standard for curtains. In addition, light is more effectively blocked from the window behind the curtain since the curtain cups against the wall, and likewise water is contained more effectively in the shower, as shown in FIG. 8.

Figure 9:
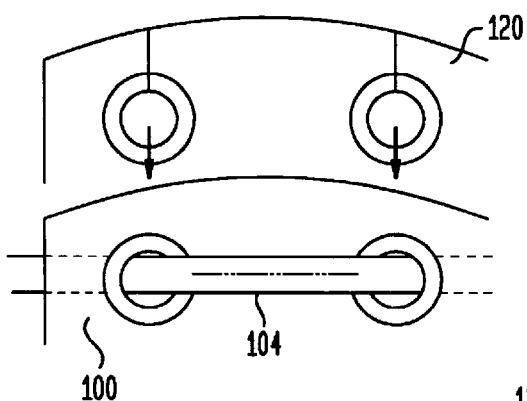
FIG. 9 is a perspective view of multiple layers of curtains for sitting on a single rod, at least one curtain having externally slit rings, in accordance with the present invention.
Figure 10:
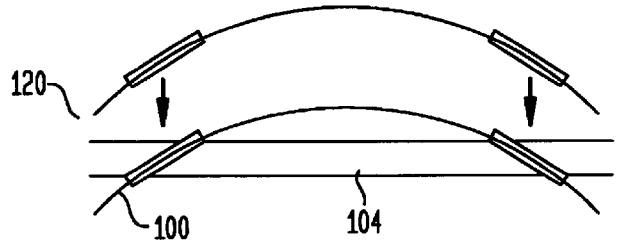
FIG. 10 is a top view of the embodiment of FIG. 9.

The external slit inventions of the present application can also be used to facilitate the placement of multiple layers of curtains on a rod. In many applications, such hotels, motels, or so forth, a fabric curtain 100 is placed on a rod 104 with a second curtain or liner 120 placed behind it. A decorative fabric shower curtain, for example, is often provided with a plastic liner behind it, the plastic liner protecting the fabric from the water of the shower. In accordance with the external slit inventions of the present application, each layer of curtain can be removed independently from the rod 104 without the need to remove any other layer, as shown in FIGS. 9 and 10.

If the liner is designed according to the inventions of the '232 patent, for example, to replace the plastic liner, the fabric curtain must first be removed from the rod, then the old liner must be removed from the rod, then the new liner is placed on the rod, and then the fabric curtain is replaced on the rod. With a liner made according to the external slit inventions herein, however, the old liner can be directly removed from the rod and a replacement liner easily placed onto the rod, without the need to remove the fabric curtain, even if the fabric curtain is made according to the '232 patent.

Figure 11:
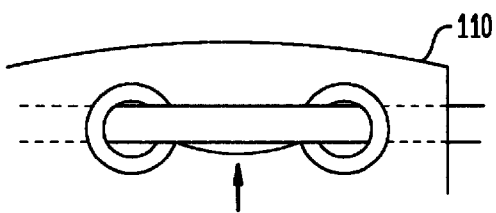
FIG. 11 is a front view of a horizontally-slit accessory product in accordance with the prior art.

The present inventions also eliminate the problem of possible drooping shown in FIG. 11. In some instances, e.g. with a heavy or a sheer fabric 110, or when there is a large spacing between the rings or fasteners the horizontal slit of the '232 inventions may droop, causing an aesthetically unpleasing effect. With the external slit embodiments disclosed herein, however, such droop is obviated.

In addition, the present inventions allow the width and the spacing of the flow of the curtain to be adjusted more readily. Using an approach purely like the '232 patent requires an even number of rings. The use of one or more external slits (in conjunction with the '232 patent design or using only external slits), on the other hand, allows an odd number of rings which is sometimes necessary due to spacing considerations between the rings (e.g. for flow of the curtain) and due to considerations governing the necessary width of the curtain or other hanging product.

Figure 12:
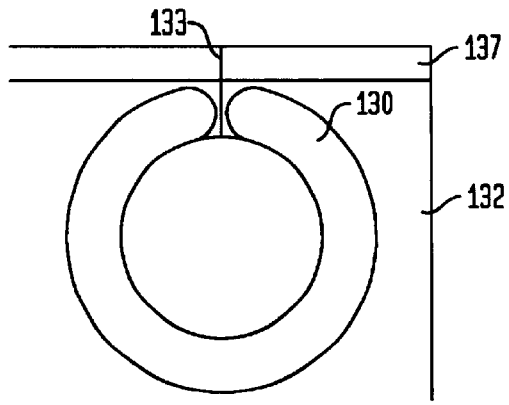
FIGS. 12 and 13 are front views of open, externally slit, rings in accordance with further embodiments of the present invention.

In one embodiment of the present inventions, ring 130 is fully within the suspended material 132. As shown in FIG. 12, in this embodiment ring 130 is below or touching hem 137 of suspended material 132.

Figure 13:
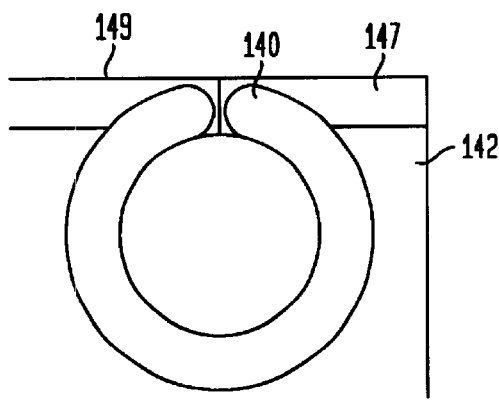

In an alternate embodiment, ring 140 overlaps with hem 147 of the curtain or suspended material 142. Preferably, the top of ring 140 is also tangent to top edge 149 of the curtain. The cutting of a series of external slits 133 across the length of the hem 137 of the curtain can often result in a hem which will droop or hang downward. Accordingly, in the embodiment of FIG. 13, the ring 140 acts to reinforce the hem, suspending the hem upward and preventing drooping. Preferably, the ring is an open ring with rounded edges, as discussed above with respect to FIG. 2. Likewise, an open ring with rounded edges (or one of the other embodiments of the present invention), or a ring with a locking device (e.g. as shown in FIGS. 22–27) can also be substituted for the closed ring shown in the other figures of the present application. Even though a simple slit in a closed ring is often provided for simplicity of illustration, the present inventions are not limited to such a closed ring.

Figure 16:
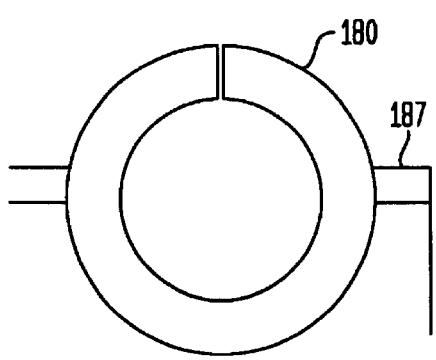
FIGS. 16 and 17 are front views of slit rings of the present invention in which the rings overlap and extend above the hem of the hanging material.
Figure 17:
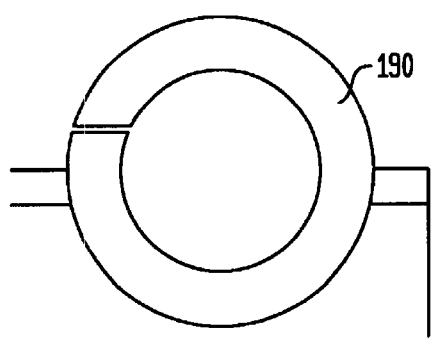

In a further alternate embodiment, as shown in FIG. 16, ring 180 overlaps with the edge of the curtain 182, such that ring extends beyond hem 187. This embodiment can be used, for example, to lengthen the curtain. The embodiment can be used with a externally slit ring 180 as shown in FIG. 16, or with a horizontally slit ring 190, as shown in FIG. 17. In yet a further embodiment, a tab 175 can be placed at the bottom of a ring 170 (either horizontally slit as shown, or a externally slit ring). Tab 175 is used to attach the ring to a curtain 172, e.g. at the hem 177.

Any desired fabric material can be used in accordance with the present invention. For example, the fabric material can be vinyl, cotton, polyester, polyester/cotton or any other natural or synthetic fabric, including woven or non-woven fabrics, and can be rigid, semi-rigid, paper, plastic, wood, metal, or the like. In one embodiment of the invention, two half rings are placed together to encapsulate the fabric material therein. In an alternate embodiment, a single ring is integrated into the fabric material.

Figure 14:
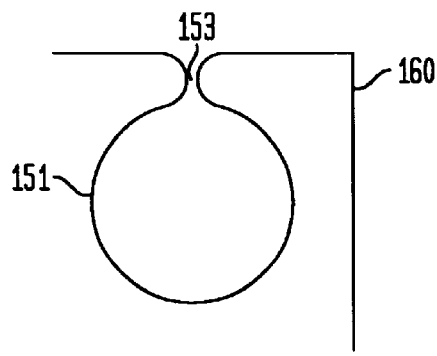
FIG. 14 is a front view of a rigid or semi-rigid material having a external slit therein, in accordance with the invention.
Figure 15:
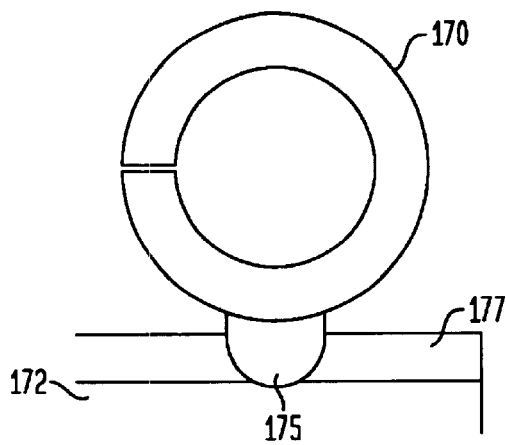
FIG. 15 is a front view of a externally slit ring having a lower tab for attachment to a hanging sheet of material in accordance with a further embodiment of the present invention.

In a further embodiment, the ring-like shape is cut directly into the material, without attaching a ring or fastener as an intermediate attachment to the hanging material. Two such embodiments are shown in FIG. 14 (left and right radial edges of slit separate) and FIG. 33 (left and right radial edges of slit touching), although any of the slit designs of the present application can be used. Other examples of preferred embodiments are shown in FIGS. 31–32. The hanging product 160 is preferably made of a relatively rigid or semi-rigid material such as a thick vinyl, either throughout the product, or at least in the area of the ring. For example, the design can be used as part of a set of blinds or so forth. The external slit 153 can be a simple closed slit, if desired, as in FIG. 1. Alternatively, it can be a more rounded design such as shown in FIGS. 2 and 14. An open slit (i.e. one with a gap between the left and right radial edges) with rounded edges is preferred. However, closed slits with rounded radial edges can be provided in this embodiment or any other embodiment of the application, as shown in FIGS. 30–33. Such closed slits with rounded radial edges are ones in which the left and right radial edges are rounded, but are also touching when the slit is not being flexed. Such closed slits with rounded radial edges provided in rings attached to the hanging product as shown, for example, in FIG. 30.

Figure 18:
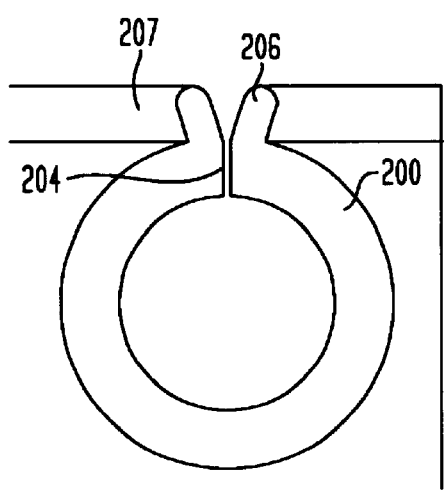
FIGS. 18, 19 and 20 are front views of further embodiments of the present invention, in which a projection, extension or finger is provided to the slit ring.
Figure 19:
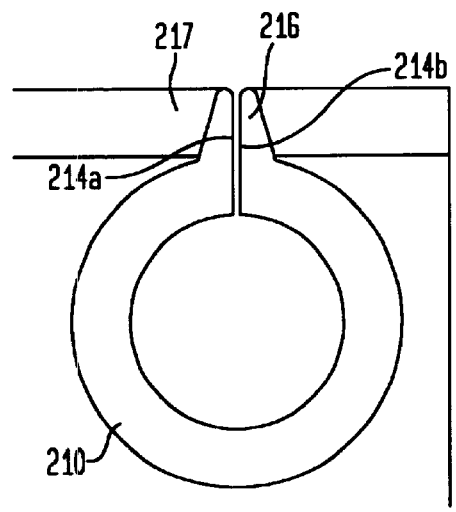
Figure 20:
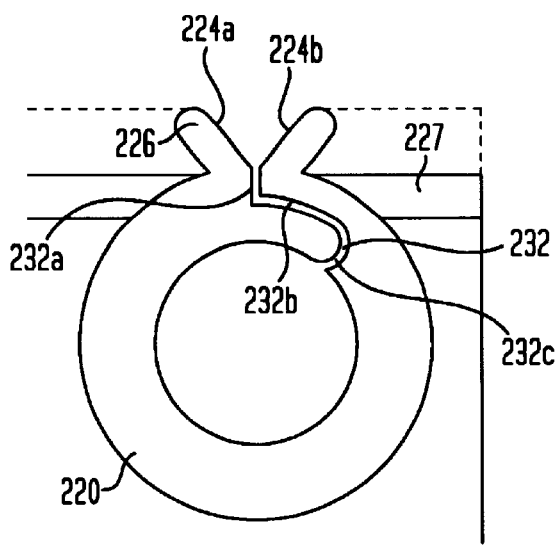

A projection, extension or finger can also be provided to the ring as shown in FIGS. 18, 19 and 20. As illustrated in the figures, in further embodiments of the invention, a ring 200, 210 or 220 is provided with a projecting edge, flange, extension, or finger 206, 216 or 226.

Extensions 206, 216 or 226 are projections off of the ring (preferably off of the ring's outer circumference), which extend beyond the ring away from the hanging product (i.e. toward the ceiling). The extensions are each located adjacent to and to the side of the slit 204. Preferably two extensions are provided, one on each side of the slit.

These extensions serve numerous functions. For example, they make it easier to open up the ring when flexing the ring. Extension 206 or 216 of FIGS. 18 and 19, for example, are provided to overlap hems 207 and 217, respectively, supporting the hems and preventing the drooping of the hem discussed above. Fingers 206 and 216 also cover the slit vertical edge of the hem, preventing it from fraying. Finger 226, on the other hand, is provided above the hem 227, with the ring 220 overlapping the hem to support it. In this embodiment, a portion of the ring—the finger only—projects above the upper edge of the curtain, similar in some ways to FIG. 16.

In a further additional design, the fingers can be spread and opposed as shown in FIGS. 18 and 20. As shown in FIG. 20, for example, fingers 226 can be provided as opposed "thumbs". In other words, inner edges 224a and 224b are at an angle to each other greater than 0 (zero) degrees but less than 180 degrees. This is in contrast to the inner edges 214a and 214b of the fingers of FIG. 19, which are parallel to each other. These spread fingers facilitate attachment of the rings 200 and 220 to a rod. They make it easier to slide the ring into the rod until the ring is pushed over the rod. They also make it easier to spread the ring open by hand to insert it over the rod. They facilitate attachment whether a simple external slit through the ring is used (as shown in FIGS. 18–20), or alternatively in conjunction with open rings with rounded edges (as shown in FIG. 2).

As an alternative to a straight external slit, a curved external slit 232 can be provided as shown in FIG. 20. In one embodiment, curved slit 232 has an upper vertical component 232a, an approximately horizontal component 232b, and a radial component 232c. Radial component 232c of slit 232 exits the inner circumference of the ring at a location which is offset to the side, rather than exiting the ring at the top of the inner circumference of ring 220 (i.e. rather than exiting directly below vertical component 232a). In this embodiment, fingers 224a and 224b are pulled to the left and right, respectively to open up the ring 220 and insert the ring over a rod. Curved slit 233, which intersects the inner circumference of the ring at an offset position rather than at the top of the ring, provides an advantage to the user in that the slit 233 will not sit directly on top of the rod while the curtain is in use. This eliminates the problem of the slit riding on the rod when the curtain is pulled open or closed. Instead, a smooth surface of the ring rides on the rod, easing movement of the curtain. The various features of the embodiment of FIG. 20 can also be provided directly to the hanging product (without using a ring) as shown in FIG. 32.

Figure 21:
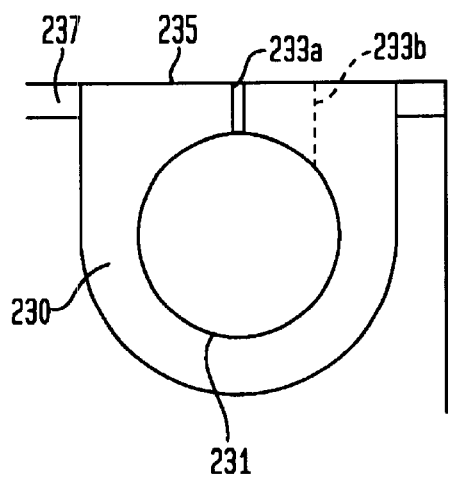
FIG. 21 is a front view of a further embodiment of the invention, in which a flat upper surface is provided to the ring to extend along and support the hanging product's hem, with an alternate location for the slit being shown in dotted outline.

In a further embodiment, the ring 230 can be provided with a flat upper edge 235, as shown in FIG. 21. Upper edge 235 overlaps with hem 237. Upper edge 235, therefore, provides yet further support for the hem over an extended length of fabric. Using the embodiment of FIG. 21, upper edge 235 provides support over a length equal to approximately the outer diameter of the ring 230 for each ring. This upper edge can be the entire upper edge of the ring. Or, it can be used a portion of the upper edge, e.g. in conjunction with an extension off the ring, as shown, for example in FIGS. 18–20.

Instead of a vertical external slit 233a, an offset slit 233b can be provided to any of the embodiments of the invention, as shown, for example, by the dotted line in FIG. 21. Offset slit 233b is a slit which intersects the inner circle 231 in a secant-like or tangent-like fashion. In other words, offset slit 233b is off center, such that the line it makes (if extended) would intersect the center of inner circle 231. This offset slit allows the ring to glide more smoothly along the rod since the slit does not sit directly on the rod's top.

Figure 22:
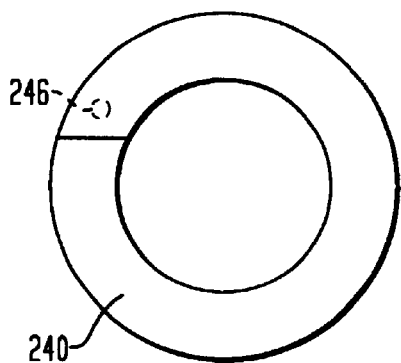
FIG. 22 is a front view of a further embodiment of the invention, in which a locking pin is used to open and close the ring.
Figure 23:
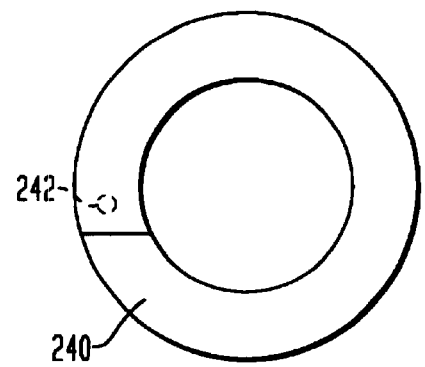
FIG. 23 is a rear view showing the embodiment of FIG. 22 rotated down 180 degrees.
Figure 24:
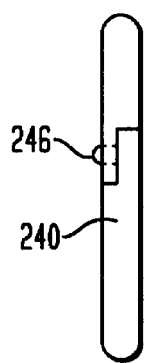
FIG. 24 is a side view of the embodiments of FIGS. 22 and 23, showing the ring in the closed position.
Figure 25:
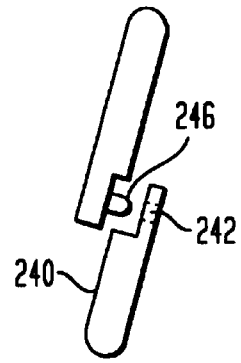
FIG. 25 is a side view of the embodiments of FIGS. 22–24, showing the ring in the open position.

In further embodiments of the invention, a ring is provided which can be selectively opened or sealed, i.e. "locked" as shown in FIGS. 22–25. FIG. 22 is a front view of ring 240, and FIG. 23 is a rear view of ring 240 after flipping the ring of FIG. 22 180 degrees downward. Ring 240 includes a pin 246 which extends through a opening or channel 242. In the open position, shown in FIG. 24, the pin 246 is separated from channel 242 forming a gap for placing the ring on a rod. In the closed position, shown in FIG. 24, pin 246 inserts snugly into channel 242 to seal the ring.

Figure 26:
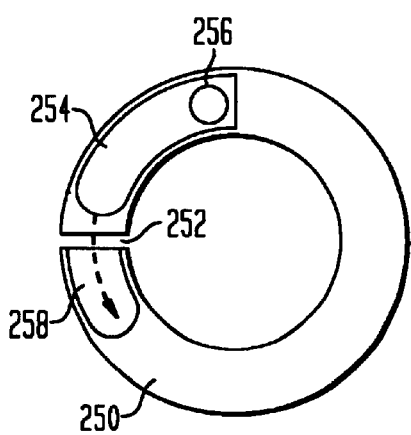
FIG. 26 is a front cross-sectional view, of a further embodiment of the present invention.
Figure 27:
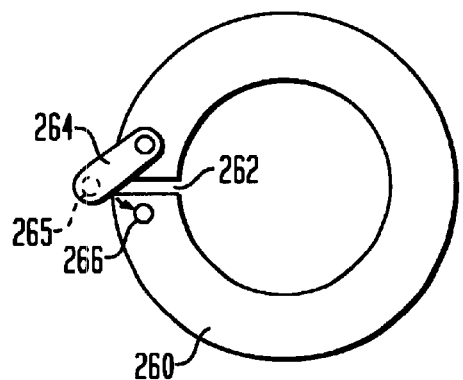
FIG. 27 is a front view of a further embodiment of the present invention.

In further embodiments of the invention, a ring 250 is provided, as shown in FIG. 26. Ring 250 includes an internal sliding member 254 which can be pushed or pulled using knob 256. Sliding member 254 slides into and out of internal channel 258 to close and open gap 252. In an alternative embodiment, shown in FIG. 27, a pivoting member 264 is provided, having a pin 265 which inserts into an opening 266. Pivoting member 264 can be rotated to open or close gap 262. In general, the embodiments of FIGS. 22–27 are useful for providing a very secure ring which cannot accidentally be pulled off of a rod. They also increases the smoothness of the sliding of the rings along the rod.

Figure 28:
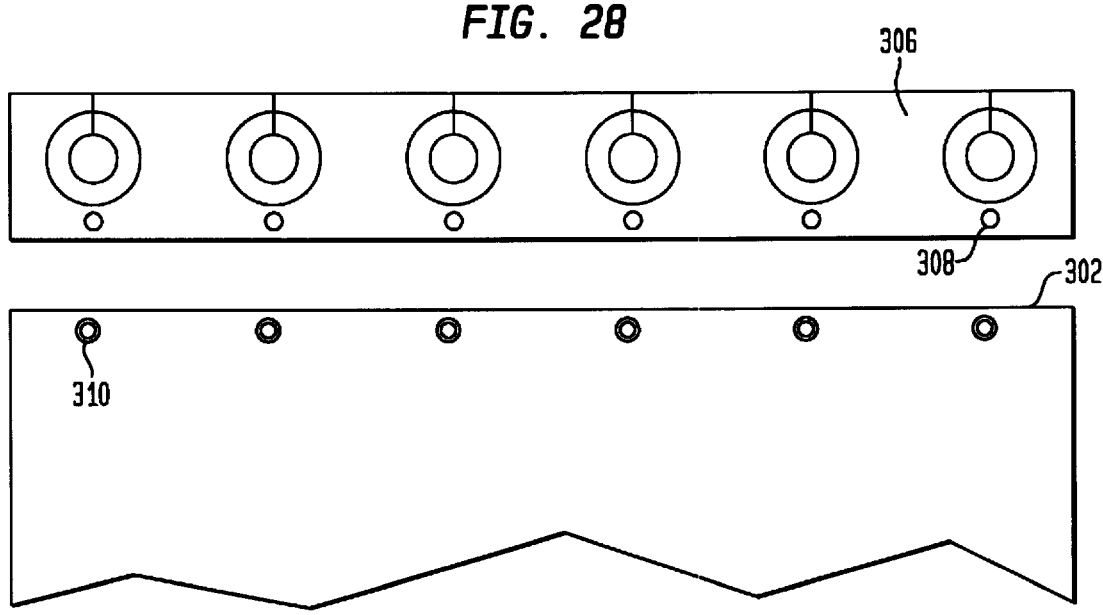
FIG. 28 is a front view of an accessory strip and hanging product in accordance with a further embodiment of the present invention.

In a further embodiment of the invention, a tape or strip may be provided as shown in FIG. 28. Strip 306 can be used to convert an existing curtain or other hanging product 302 into one of the present invention, or can be used to provide a hanging product in which the specific types of fasteners or provided on top can be interchanged. Strip 306 includes attachment devices 308 which attach to the top of the hanging product 302. The attachment device can be reversibly detachable, e.g. via snaps, a button and hole type design, a zipper, or a hook, or can be more permanent, e.g. via sewing, welding, adhesive, or so forth. Any other attachment methods for attaching the strip to the hanging product can be used as well. In one embodiment, an existing hanging product with holes 310 can easily be converted to one of the present invention by attaching the strip 306 to the hanging product using the holes 310. As with the other hanging products of the present invention, the hanging product 302 can be woven, non-woven, rigid, semi-rigid, or so forth.

Figure 29:
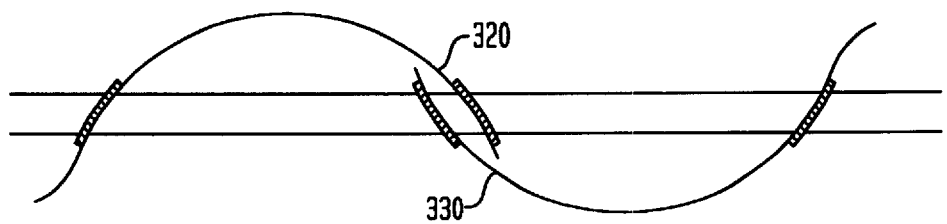
FIG. 29 is a top view of a method for sequentially arranging the embodiments of the present invention.

Further in accordance with the invention, any of the embodiments of the present application can be placed in sequence from right to left, as shown in FIG. 29. This allows a person to cover a long window, shower or so forth, by using two or more curtains when the item to be covered is longer than the width of a single curtain. In addition, overlaps can be used, as shown in FIG. 29. When the curtains are overlapped, the edge of one curtain 320 extends beyond the edge of the other curtain 330, minimizing or eliminating the appearance of any gap between the curtains.

Figure 30:
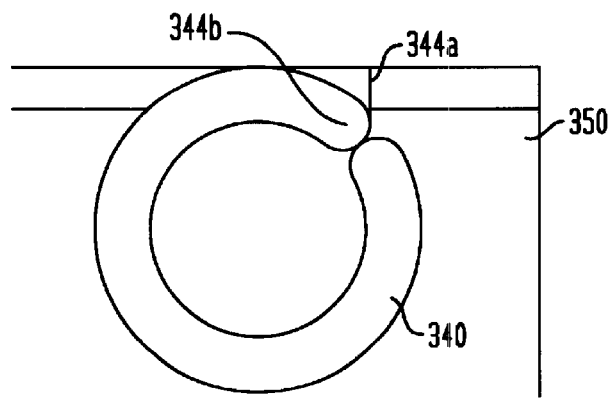
FIGS. 30–33 are front views of further embodiments of the present invention.

As shown in FIG. 30, the slit 344 can include a segment or slit 344a which extends through the hanging product 350, and a segment or slit 344b which extends through the ring 340. As previously discussed with respect to FIG. 20, the slit 344 need not be in a straight line. As shown in FIG. 30, slit 344a is at an angle to slit 344b, the angle being other than 180 degrees. If desired, the slits 344a and 344b can combine to form a curved slit, or can be two straight segments at any angle to each other, the latter being shown in FIG. 30.

Figure 31A:
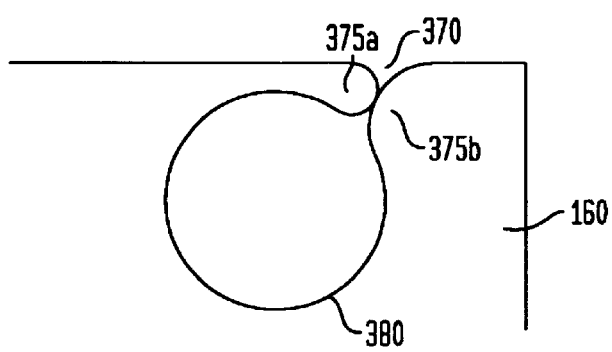
Figure 32:
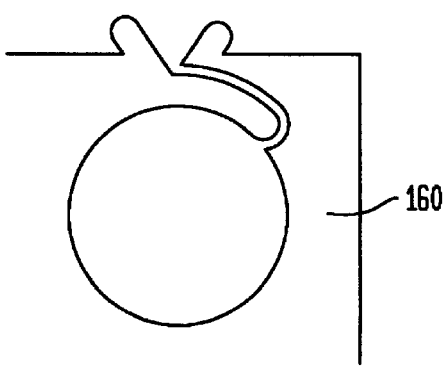

As shown in FIG. 31(a), in a further preferred embodiment the hanging product includes an inner cut-out area 380, also shown as 151 in FIG. 14. The hanging product includes a slit 370 which extends from the edge of the hanging product to the inner cut-out area 380. Slit 370 includes a left radial edge 375a and a right radial edge 375b. Preferably, the slit is an offset slit. Further preferably, the radius of the left radial edge 375a is different than the radius of the right radial edge 375b. FIG. 31(a) can therefore be contrasted with FIG. 33 which shows an embodiment in which the left and right radial edges 388a and 388b are of equal radii, and wherein the slit is not offset but central, along the radius of the circle. It is also preferred that the left radial edge and right radial edge contact each other, as shown in both FIGS. 31(a) and 33, although a gap can alternately be provided.

Figure 31B:
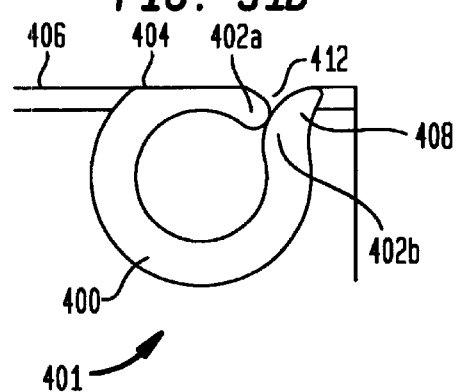

A hanging product can also have a ring designed in this fashion, as shown in FIG. 31(b). Ring 400 is provided as part of hanging product 401. Ring 400 includes a slit 412. Slit 412 (and likewise ring 400) has a left radial edge 402a and a right radial edge 402b, wherein left radial edge 402a and right radial edge 402b have different radii. The ring 400 includes an edge 404 which is flat along at least a portion of the upper edge of the ring and preferably overlaps hem 406. Extension 408 off of the ring 400 further serves to ease the opening of the ring and its attachment onto a rod, and also serves to support the hem 406.

Although the present inventions have been described in some embodiments using curtains as an illustration, it is to be understood that they may be used with any of the products of the related applications listed above, the contents of which are incorporated herein by reference.

Having described this invention with regard to specific embodiments, it is to be understood that the description is not meant as a limitation since further modifications and variations may be apparent or may suggest themselves. It is intended that the present application cover all such modifications and variations.

What is claimed is:

1. A product comprising:
   an item for hanging, said item comprising an opening for suspending said item from a rod, said item comprising a ring attached to said opening such that said opening is reinforced by said ring, said ring comprising an inner circumference, said inner circumference comprising a top when said item is hanging, said item comprising an upper edge, said item comprising a slit extending from said upper edge through said ring to said opening, said slit intersecting said inner circumference of said ring at a point offset from said top, said slit further comprising an approximately horizontal component when said item is hanging from the rod.

2. A product as claimed in claim 1, wherein said ring is a closed ring.

3. A product as claimed in claim 1, wherein said ring comprises at least one radial edge, said radial edge being rounded.

4. A product as claimed in claim 1, wherein said ring has an upper edge, and said upper edge of said ring is tangent to said upper edge of said item.

5. A product as claimed in claim 1, wherein at least a portion of said ring extends above said upper edge of said item.

6. A product as claimed in claim 1, wherein said item is a curtain.

7. A product as claimed in claim 1, wherein said item is selected from the group consisting of: shower curtains, window curtains, window treatments, blinds, shades, drapery, portierres, room dividers, and windscreens.

8. A product as claimed in claim 1, wherein said slit comprises a left radial edge and a right radial edge and wherein at least one of said left radial edge and said right radial edge is rounded.

9. A product, said product comprising:
   an item for hanging, said item comprising an opening for hanging said item from a rod, said item further comprising a ring attached to said opening such that said ring reinforces said opening, said item comprising an upper edge, said item comprising a slit extending from said upper edge through said ring to said opening;
   said item further comprising at least two projecting fingers for opening said slit to attach said item onto the rod via said slit, said projecting fingers comprising a first projecting finger comprising a first inner edge and a second projecting finger comprising a second inner edge, wherein said first inner edge and said second inner edge are at an angle to each other between zero degrees and one hundred eighty degrees.

10. A product as claimed in claim 9, wherein said finger is adjacent to said slit.

11. A product as claimed in claim 9, wherein one of said fingers is located on the right side of said slit and one of said fingers is located on the left side of said slit.

12. A product as claimed in claim 9, wherein said fingers point away from said hanging product.

13. A product as claimed in claim 9, wherein said ring is a closed ring.

14. A product as claimed in claim 9, wherein said ring comprises at least one radial edge, said radial edge being rounded.

15. A product as claimed in claim 9, wherein said ring has an upper edge, and said upper edge of said ring is tangent to said upper edge of said item.

16. A product as claimed in claim 9, wherein said slit has an approximately horizontal component.

17. A product as claimed in claim 9, wherein said item is a curtain.

18. A product as claimed in claim 9, wherein said item is selected from the group consisting of: shower curtains, window curtains, window treatments, blinds, shades, drapery, portierres, room dividers, and windscreens.

19. A product as claimed in claim 9, wherein said slit comprises a left radial edge and a right radial edge and wherein at least one of said left radial edge and said right radial edge is rounded.

20. A product, said product comprising:
   an item for hanging, said item comprising an opening for hanging said item from a rod, said item further comprising a ring attached to said opening to reinforce said opening, said ring comprising an outer circumference and an inner circumference, said item comprising an upper edge when said item is hanging, said item comprising a curved slit extending from said upper edge to said opening;
   said opening further comprising projecting fingers for opening said slit to attach said item onto the rod via said slit, said projecting fingers comprising a first projecting finger comprising a first inner edge and a second projecting finger comprising a second inner edge, wherein said first inner edge and said second inner edge are at an angle to each other between zero degrees and one hundred eighty degrees.

21. A product as claimed in claim 20, wherein said finger points away from said hanging product.

22. A product as claimed in claim 20, wherein said ring is a closed ring.

23. A product as claimed in claim 20, wherein said ring comprises at least one radial edge, said radial edge being rounded.

24. A product as claimed in claim 20, wherein said ring has an upper edge, and said upper edge of said ring is tangent to said upper edge of said item.

25. A product as claimed in claim 20, wherein said ring overlaps said upper edge of said items.

26. A product as claimed in claim 20, wherein said item is a curtain.

27. A product as claimed in claim 20, wherein said item is selected from the group consisting of: shower curtains, window curtains, window treatments, blinds, shades, drapery, portierres, room dividers, and windscreens.

28. A product as claimed in claim 20, wherein said slit comprises a left radial edge and a right radial edge and wherein at least one of said left radial edge and said right radial edge is rounded.

29. A product as claimed in claim 20, wherein one of said fingers is located on the right side of said slit and one of said fingers is located on the left side of said slit.

* * * * *